Sept. 19, 1961  R. C. HILL  3,000,047
DOOR PULL FASTENER
Filed April 29, 1960
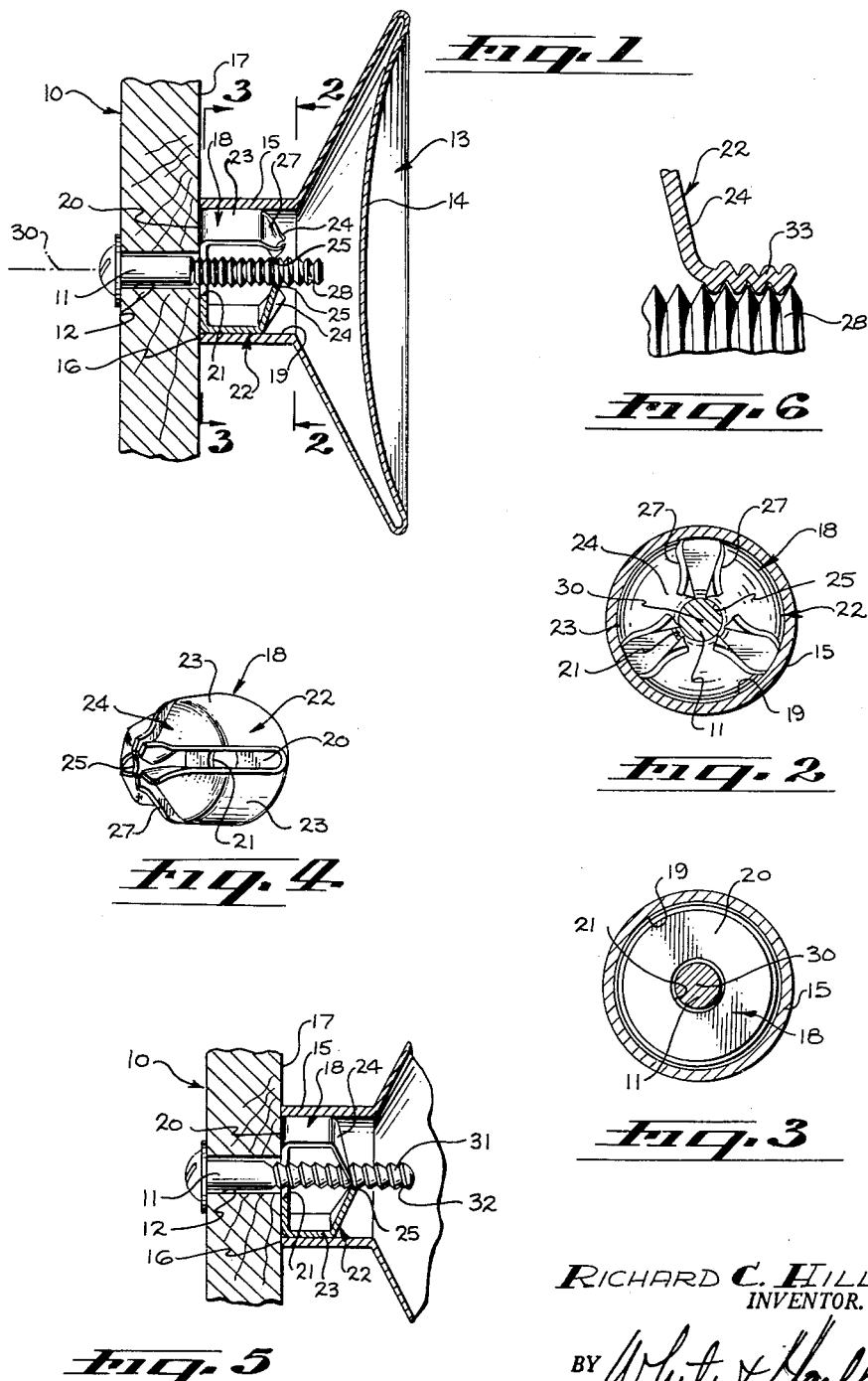
RICHARD C. HILL
INVENTOR.
BY
ATTORNEYS under the 3,000,047
DOOR PULL FASTENER
Richard C. Hill, 2317 S. 4th St., Arcadia, Calif.
Filed Apr. 29, 1960, Ser. No. 25,643
6 Claims. (Cl. 16—121)

This invention has to do generally with fastening devices, and more particularly concerns insert fasteners expansible in response to displacement of a screw with which the fastener cooperates.

The invention is primarily directed to the problem of fastening a tubular part, such as a tubular boss on a door pull, to a panel or door, in a simple, economical and rapid manner. In accordance with the invention, this problem is solved by providing a one-piece insert fastener, typically a sheet metal stamping, which is so formed as to be insertable within the tubular recess of the door pull to grip tightly the recess inner side wall in response to turning of a screw extending through the door or panel and into the insert fastener within the recess.

More specifically, the insert fastener is formed to have an annular base through which the screw is insertable in a forward direction, the insert also having wings with gripping portions which extend forwardly adjacent the recess inner side wall preferably with an interference fit when the insert is placed in the recess. Finally, the wings include spreading portions which taper forwardly away from the gripping portions and away from the base toward and into engagement with the screw thread. As a result, when the screw is turned it tends to draw the spreading portions of the wings toward the base, which in turn forces the gripping portions of the wings into increasingly tight gripping engagement with the inner wall of the recess, whereby, the tubular part or door pull is held tightly to the insert, and the insert is held by the screw to the door or panel.

Other objects of the invention include the provision of wing spreading portions having free terminal ends, and which are forwardly deflectible to ratchet over the screw threads in response to forward displacement, without turning, of the screw relative to the base. Also, the invention contemplates the provision of stiffening flutes on the spreading portions of the wings, and internal screw threads on the spreading portions of the wings, for cooperation with the screw extending into the insert.

These and other objects and advantages of the invention as well as the details of an illustrative embodiment, will be more fully understood from the following detailed description of the drawings, in which:

FIG. 1 is a vertical view taken in section through a door panel showing the insert fastener assembled into the screw and to the door pull;

FIG. 2 is a section taken on line 2—2 of FIG. 1;

FIG. 3 is a section taken on line 3—3 of FIG. 1;

FIG. 4 is a perspective showing of the insert fastener of FIG. 1;

FIG. 5 is a view like FIG. 1 with a modified view of the screw; and

FIG. 6 is an enlarged section showing an internally threaded wing of the insert fastener in engagement with the actuating screw.

Referring first to FIG. 1 of the drawings, the closure panel such as a door is indicated generally at 10, with a screw 11 extending forwardly through a drilled opening 12 in the panel. At the forward side of the panel there is shown at 13 a door pull having an enlarged hollow handle portion 14 and a cylindrical boss 15 that projects rearwardly from the handle portion. Typically, the door pull 13 is made of thin sheet material in one or more pieces, formed into the desired shape.

It is the object of the invention to provide a simple means for attaching the cylindrical or tubular boss portion 15 of the door pull to the forward side of the panel 10 in a tight or firmly connected relation, with the rearward terminal edge 16 of portion 15 abutting the forward face 17 of the panel 10.

This object is served by providing a one-piece insert generally indicated at 18 within the recess or bore 19 formed by the boss to open rearwardly toward the panel 10. The sheet metal insert is typically stamped from thin sheet stock to have a cupped base 20 containing an opening 21 through which the screw 11 freely extends. The insert also has three wings 22 with cylindrical segment gripping portions 23, which extend forwardly adjacent the inside wall of the boss 15 to frictionally grip that wall, as will be described. The three wings 22 also include spreading portions 24 which taper forwardly relatively away from the gripping portions 23 and away from the base, toward and into engagement with the thread of the screw 11 as seen in FIGS. 1 and 2. Typically, the terminal ends 25 of the spreading portions penetrate the spaces between adjacent screw threads so that they are retracted rearwardly toward the base 20 in response to righthand turning of the screw 11 in a tightening direction. As a result the spreading portions 24 tend to push outwardly and thereby cause the gripping portions 23 of the wings increasingly to grip frictionally the interior surface or wall of the boss 15. Therefore, the insert 18 in effect becomes rigidly connected to the door pull 13, and tightening of the screw 11 draws the door pull and the insert into tight engagement with the foreward side 17 of the panel 10 establishing a permanent connection.

Referring now to FIGS. 2 and 4, it will be observed that the insert includes three wings 22, this number being preferable but not absolutely necessary, since inserts with two or four wings, or other numbers of wings, may be produced and used in the same general manner as described herein. FIGS. 2 and 4 also show that the spreading portions 24 of the wings 22 are fluted in forwardly tapering directional extent, for stiffening the spreading portions against bending, which would otherwise tend to be produced during their retraction toward the base 20 by turning of the screw. These flutes are typically formed by flanges 27 projecting outwardly at the opposite side edges of the spreading portions 24 of the wings. However, it is another feature of the invention that the spreading portions 24 are forwardly deflectable to ratchet over the screw threads 28 in response to forward displacement without turning of the screw relative to the base. As a result, the screw may be very quickly inserted as shown in FIG. 1, and thereafter turned to tighten the assembly to the panel 10. To prevent displacement of the insert 18 into the deep interior of the door pull during such assembly, it is a feature of the invention that the gripping portions 23 of the insert are slightly oversize in outer dimension, or expanded, in relation to the bore 19 of the boss 15, to an extent such that the insert must be forcibly pushed into the bore 19, causing the spreading portions 24 of the wings to deflect inwardly toward the axis 30 of the assembly. Under these conditions the screw is then insertable forwardly through the insert to cause the spreading portions 24 to ratchet or cam over the screw threads. Also, it is noted that the terminal ends 25 normally project slightly into the zone occupied by the screw before the screw is inserted.

FIG. 5 shows essentially the same assembly as is illustrated in FIG. 1, with the exception that the screw threads have forward sides 31 tapering forwardly to a considerable angular extent and rearward sides 32 which taper sharply rearwardly. This type screw thread is well adapted to being pushed forwardly through the insert to cause the spreading portions 24 of the wings to ratchet or cam over the screw threads, retention of the terminal edges 25 between the threads being assured by engagement of the sharply tapered rearward sides 32 of the threads against the terminal ends 25.

FIG. 6 shows the spreading portions 24 of the wings 22 having interiorly threaded terminal end portions 33 which are engageable with the screw threads 28. These interiorly threaded portions 33 are well adapted to remain in interfitting engagement with the screw 28 during retraction of the spreading portions 24 of the wings, since they tend to be forced against threads 28 during such retraction.

I claim:

1. An assembly rapidly connectible to a panel, comprising body means forming a rearwardly opening tubular recess for exposure to the panel forward side, a screw extensible through the panel and projecting forwardly into the recess, and a one-piece insert in said recess having a rearwardly exposed base containing an opening through which the screw extends, said insert having wings with gripping portions which extend forwardly adjacent the body recess bore wall and with spreading portions which taper forwardly relatively away from said gripping portions and the base toward and into engagement with the screw thread, said gripping portions of the wings having cylindrical outer surface extent engageable with and having curvature remaining substantially the same as the body bore wall, said gripping portions being slightly oversize in relation to said recess bore prior to reception of the insert in said recess, said outer surfaces of the gripping portions being in interference engagement with said bore mall when the insert is received in the recess, whereby said gripping portions may be caused increasingly to grip said recess wall in response to turning of the screw tending to draw said spreading portions toward said base.

2. An assembly rapidly connectible to a panel, comprising door pull body means forming a rearwardly opening tubular recess for exposure to the panel forward side, a screw extensible through the panel and projecting forwardly into the recess, and a one-piece sheet metal insert in said recess having a rearwardly exposed base containing an opening through which the screw extends, said insert having wings with gripping portions which extend forwardly adjacent the body recess bore wall and with spreading portions which taper forwardly relatively away from said gripping portions and the base toward and into engagement with the screw thread, said gripping portions of the wings having cylindrical outer surface extent engageable with and having curvature remaining substantially the same as the body bore wall, said gripping portions being slightly oversize in relation to said recess bore prior to reception of the insert in said recess, said outer surfaces of the gripping portions being in interference engagement with said bore wall when the insert is received in the recess, whereby said gripping portions may be caused increasingly to grip said recess wall in response to turning of the screw tending to draw said spreading portions toward said base.

3. The invention as defined in claim 2 in which said spreading portions of the wings have free terminal ends and are forwardly deflectible to ratchet over the screw threads in response to forward displacement, without turning, of the screw relative to said base.

4. The invention as defined in claim 3 in which the forwardly presented sides of the screw threads have greater taper than the rearwardly presented sides of said threads to facilitate said ratcheting.

5. The invention as defined in claim 2 in which said spreading portions of the wings extend into the zone to be occupied by the screw when the screw is rearwardly retracted out of said zone, said spreading portions of the wings being forwardly convergent toward the screw and internally threaded for engagement by the screw.

6. The invention as defined in claim 2 in which certain forwardly tapering extents of the spreading portions of the wings are fluted for stiffening against bending.

References Cited in the file of this patent

UNITED STATES PATENTS

| | | |
|---|---|---|
| 453,870 | Stevens | June 9, 1891 |
| 2,218,581 | Levan | Oct. 22, 1940 |
| 2,234,097 | Tinnerman | Mar. 4, 1941 |
| 2,238,705 | Miller | Apr. 15, 1941 |
| 2,594,027 | Jakeway | Apr. 22, 1952 |